United States Patent
Liu et al.

(10) Patent No.: US 11,265,048 B2
(45) Date of Patent: Mar. 1, 2022

(54) GROUP-BASED UNEQUAL MCS SCHEMES FOR A SINGLE USER STATION IN WLAN TRANSMISSIONS

(71) Applicant: MediaTek Singapore Pte. Ltd., Solaris (SG)

(72) Inventors: Jianhan Liu, San Jose, CA (US); Shengquan Hu, San Jose, CA (US); Yongho Seok, San Jose, CA (US); Thomas Edward Pare, Jr., San Jose, CA (US); Yungping Hsu, Hsin-Chu (TW)

(73) Assignee: Mediatek Singapore PTE. LTD., Singapore (SG)

( * ) Notice: Subject to any disclaimer, the term of this patent is extended or adjusted under 35 U.S.C. 154(b) by 0 days.

(21) Appl. No.: 16/255,582

(22) Filed: Jan. 23, 2019

(65) Prior Publication Data
US 2019/0238195 A1    Aug. 1, 2019

Related U.S. Application Data

(60) Provisional application No. 62/624,862, filed on Feb. 1, 2018.

(51) Int. Cl.
*H04B 7/0456* (2017.01)
*H04L 1/00* (2006.01)
(Continued)

(52) U.S. Cl.
CPC .......... *H04B 7/0456* (2013.01); *H04B 7/028* (2013.01); *H04B 7/0413* (2013.01); *H04L 1/00* (2013.01);
(Continued)

(58) Field of Classification Search
None
See application file for complete search history.

(56) References Cited

U.S. PATENT DOCUMENTS 8,036,298 B2 * 10/2011 Kim .................... H04L 1/20
375/267
8,295,401 B2 * 10/2012 Olesen .................. H04L 1/0606
375/299
(Continued)

FOREIGN PATENT DOCUMENTS

CN    1879325 A  * 12/2006    .......... H04L 1/0003
CN    1879325 A    12/2006
(Continued)

*Primary Examiner* — Berhanu Tadese

(57) ABSTRACT

Systems and methods of transmitting a PPDU to or from a single user station (STA) in an MIMO transmission by using unequal MCSs. An access point (AP) allocates a plurality of spatial streams to the STA and assigned them into groups for the MIMO transmission. Multiple unequal MCSs are assigned to the different spatial stream groups. Correspondingly the STA ID is repeatedly specified in the user block fields of a SIG-B field of a downlink PPDU, or in the user information fields of a trigger frame. Alternatively, multiple AIDs of the STA can be specified in the user block fields or the user information fields instead of repeating the same STA ID. An indication may be inserted in the SIG-A field to indicate that the grouped-based unequal MCSs scheme is used for the MIMO transmission.

25 Claims, 12 Drawing Sheets

(51) Int. Cl.
*H04B 7/02* (2018.01)
*H04B 7/0413* (2017.01)

(52) U.S. Cl.
CPC .......... *H04L 1/0003* (2013.01); *H04L 1/0009* (2013.01)

(56) References Cited

U.S. PATENT DOCUMENTS

| | | | | |
|---|---|---|---|---|
| 8,824,400 | B2* | 9/2014 | Seok | H04L 27/2626 370/329 |
| 9,025,558 | B2* | 5/2015 | Seok | H04W 72/046 370/329 |
| 9,338,789 | B2* | 5/2016 | Wang | H04L 1/1664 |
| 9,480,055 | B2* | 10/2016 | Seok | H04L 1/0009 |
| 9,520,964 | B2* | 12/2016 | Sohn, III | H04L 1/0025 |
| 9,531,520 | B2* | 12/2016 | Kwon | H04L 1/1685 |
| 9,544,030 | B2* | 1/2017 | Roh | H04L 1/0041 |
| 9,577,728 | B1* | 2/2017 | van Nee | H04B 7/0452 |
| 9,629,129 | B2* | 4/2017 | Seok | H04W 72/0406 |
| 9,681,462 | B2* | 6/2017 | Wang | H04W 74/004 |
| 9,807,759 | B2* | 10/2017 | Roh | H04B 7/0413 |
| 9,819,473 | B2 | 11/2017 | Choi et al. | |
| 9,832,760 | B2* | 11/2017 | Seok | H04L 1/0009 |
| 9,860,908 | B2* | 1/2018 | Wang | H04L 1/1861 |
| 9,936,488 | B2* | 4/2018 | Seok | H04W 72/046 |
| 9,985,739 | B2* | 5/2018 | Seok | H04L 1/1614 |
| 10,122,628 | B2* | 11/2018 | Cariou | H04L 1/1614 |
| 10,153,886 | B2* | 12/2018 | Kwon | H04W 72/042 |
| 10,231,251 | B2* | 3/2019 | Wang | H04L 1/1861 |
| 10,321,473 | B2* | 6/2019 | Kim | H04W 72/1278 |
| 10,356,711 | B2* | 7/2019 | Park | H04W 4/06 |
| 2008/0049654 | A1* | 2/2008 | Otal | H04W 28/06 370/311 |
| 2009/0116544 | A1* | 5/2009 | Zhang | H04L 1/20 375/227 |
| 2009/0116589 | A1* | 5/2009 | Zhang | H04L 1/0016 375/341 |
| 2009/0175181 | A1* | 7/2009 | Kim | H04L 1/20 370/252 |
| 2010/0260114 | A1* | 10/2010 | Vermani | H04L 5/0055 370/329 |
| 2012/0155415 | A1* | 6/2012 | Seok | H04B 7/0452 370/329 |
| 2013/0010844 | A1* | 1/2013 | Amini | H04L 1/0036 375/219 |
| 2013/0208715 | A1* | 8/2013 | Roh | H04B 7/0697 370/338 |
| 2013/0229996 | A1* | 9/2013 | Wang | H04L 1/1685 370/329 |
| 2013/0301555 | A1* | 11/2013 | Porat | H04L 5/0007 370/329 |
| 2013/0301556 | A1* | 11/2013 | Porat | H04L 1/0041 370/329 |
| 2014/0334413 | A1* | 11/2014 | Seok | H04W 72/0406 370/329 |
| 2015/0223223 | A1* | 8/2015 | Seok | H04L 27/2626 370/335 |
| 2015/0256238 | A1* | 9/2015 | Roh | H04L 1/0041 370/329 |
| 2015/0256309 | A1 | 9/2015 | Tong et al. | |
| 2016/0029403 | A1* | 1/2016 | Roy | H04W 72/1226 370/336 |
| 2016/0050659 | A1* | 2/2016 | Seok | H04L 1/1671 370/338 |
| 2016/0065467 | A1* | 3/2016 | Wu | H04B 7/0689 370/392 |
| 2016/0127076 | A1* | 5/2016 | Sohn, III | H04L 1/0026 370/252 |
| 2016/0143026 | A1* | 5/2016 | Seok | H04W 72/046 370/329 |
| 2016/0149634 | A1* | 5/2016 | Kalkunte | H04B 7/1555 375/267 |
| 2016/0150514 | A1 | 5/2016 | Kwon et al. | |
| 2016/0227569 | A1* | 8/2016 | Wang | H04W 72/0413 |
| 2016/0285608 | A1* | 9/2016 | Kwon | H04L 1/18 |
| 2016/0315681 | A1* | 10/2016 | Moon | H04W 74/0816 |
| 2017/0041913 | A1* | 2/2017 | Seok | H04W 72/0406 |
| 2017/0041929 | A1* | 2/2017 | Noh | H04L 5/0007 |
| 2017/0063511 | A1* | 3/2017 | Kwon | H04L 1/18 |
| 2017/0094646 | A1* | 3/2017 | Roh | H04B 7/0697 |
| 2017/0094664 | A1* | 3/2017 | Lee | H04L 5/0053 |
| 2017/0099089 | A1* | 4/2017 | Liu | H04L 25/022 |
| 2017/0196001 | A1* | 7/2017 | Seok | H04W 72/046 |
| 2017/0231009 | A1* | 8/2017 | Wang | H04W 72/0453 |
| 2017/0273112 | A1* | 9/2017 | Lou | H04W 72/121 |
| 2017/0280383 | A1* | 9/2017 | Park | H04W 74/06 |
| 2017/0289926 | A1* | 10/2017 | Sutskover | H04W 52/325 |
| 2017/0310339 | A1 | 10/2017 | Lee et al. | |
| 2017/0331734 | A1* | 11/2017 | Cariou | H04L 1/1685 |
| 2017/0367078 | A1* | 12/2017 | Chun | H04L 5/0053 |
| 2018/0007712 | A1* | 1/2018 | Lou | H04W 74/006 |
| 2018/0063725 | A1* | 3/2018 | Elsherif | H04B 7/0452 |
| 2018/0084566 | A1* | 3/2018 | Wang | H04W 74/006 |
| 2018/0103487 | A1* | 4/2018 | Asterjadhi | H04W 74/02 |
| 2018/0124806 | A1* | 5/2018 | Kim | H04W 72/1205 |
| 2018/0132278 | A1* | 5/2018 | Oteri | H04W 74/0808 |
| 2018/0139635 | A1* | 5/2018 | Oteri | H04W 24/08 |
| 2018/0176743 | A1* | 6/2018 | Elsherif | H04B 17/336 |
| 2018/0220357 | A1* | 8/2018 | Kim | H04W 74/08 |
| 2018/0317173 | A1* | 11/2018 | Kim | H04W 52/02 |
| 2018/0323901 | A1* | 11/2018 | Seok | H04L 1/0003 |
| 2018/0332529 | A1* | 11/2018 | Kim | H04W 52/0206 |
| 2018/0337709 | A1* | 11/2018 | Zou | H04L 1/203 |
| 2018/0337713 | A1* | 11/2018 | Elsherif | H04B 7/0417 |
| 2018/0359807 | A1* | 12/2018 | Kim | H04W 74/04 |
| 2019/0090259 | A1* | 3/2019 | Oteri | H04B 7/0452 |
| 2019/0238195 | A1* | 8/2019 | Liu | H04B 7/028 |
| 2019/0238288 | A1* | 8/2019 | Liu | H04W 72/044 |
| 2019/0261385 | A1* | 8/2019 | Wang | H04L 1/1861 |
| 2019/0289632 | A1* | 9/2019 | Lou | H04B 7/0452 |

FOREIGN PATENT DOCUMENTS

| | | | | |
|---|---|---|---|---|
| CN | 105960807 A | * | 9/2016 | ........... H04L 5/0055 |
| CN | 106664165 A | * | 5/2017 | ......... H04L 27/2601 |
| CN | 106664165 A | | 5/2017 | |
| CN | 107113833 A | * | 8/2017 | ........... H04L 5/0053 |
| GB | 201322395 | * | 2/2014 | ............... H04B 7/04 |
| GB | 201322395 A | | 3/2014 | |
| TW | 201711504 A | | 3/2017 | |
| WO | 2017027573 A1 | | 2/2017 | |

* cited by examiner

GROUP-BASED UNEQUAL MCS SCHEMES FOR A SINGLE USER STATION IN WLAN TRANSMISSIONS

CROSSREFERENCE TO RELATED APPLICATION

This patent application claims priority and benefit of the U.S. Provisional Patent Application No. 62/624,862, entitled "GROUPED-BASED UNEQUAL MCS TRANSMISSION SCHEMES IN WLAN," filed on Feb. 1, 2018, the entire content of which is herein incorporated by reference for all purposes.

TECHNICAL FIELD

Embodiments of the present disclosure relate generally to the field of network communication, and more specifically, to the field of communication protocols used in wireless communication.

BACKGROUND OF THE INVENTION

Wireless local area networks (WLANs) and mobile communication devices have become increasingly ubiquitous, such as smart phones, wearable devices, various sensors, Internet-of-Things (IoTs), etc. In multiple input, multiple output (MMO) transmissions, an access point (AP) with multiple antennas can simultaneously transmit data to by spatial multiplexing via different spatial paths, e.g., to multiple receive stations or one station with multiple antennas.

According to IEEE 802.11ac/ax Standards and Specifications, in a very high throughput (VHT) or high efficiency (HE) WLAN, for single user (SU) MIMO, only one modulation and coding scheme (MCS) can be applied to all the spatial streams for the user station. For multi-user (MU) MIMO, different users can use different MCSs which can greatly enhance network performance and throughput. However, for each user station in MU-MIMO, still only one MCS can be applied to all the spatial streams.

Existing VET or HE AP or non-AP station products are typically built in with multiple encoders and decoders, especially the AP or non-AP stations that support MU-MIMO. Limiting one MCS to one station imposes a considerable constraint to the performance and throughput of the WLAN.

SUMMARY OF THE INVENTION

Accordingly, systems and methods disclosed herein provide effective and backwards-compatible communication protocols to enable multiple unequal modulation and encoding schemes to be used in a multiple input, multiple output (MIMO) transmission to, or from, a single user station in a wireless local area work (WLAN), thereby enhancing spatial usage efficiency and overall network performance and throughput.

Embodiments of the present disclosure include using an access point (AP) to allocate multiple groups of spatial streams and multiple unequal MCSs to a non-AP STA (or herein "STA" for brevity unless specified otherwise) for the STA to transmit or receive in an MIMO transmission. Each group of spatial streams is modulated and encoded by using a different MCS. The unequal MCS allocation is communicated to the STA by identifying the STA in multiple user fields in a packet preamble, each corresponding to a respectively MCS and the corresponding group of spatial streams.

In some embodiments, the packet has a multi-user (MU) format in which a plurality of user fields are originally defined for spatial stream allocation and MCS assignment to multiple users, each user corresponding to a respective MCS and identified by its STA ID in a user field. By reusing the user fields in the MU format to allocate multiple MCSs to a single user station, the user STA receiving the packet can still recognize various packet fields correctly and decipher the information of MCS assignment and spatial stream allocation based on the multiple user fields. This reused packet portion advantageously causes no incorrect operation or transmission interference by legacy receive STAs that do not support the reuse scheme, advantageously achieving backward compatibility with the legacy receive STAs.

In some embodiments, for a downlink MIMO transmission, the AP generates a multi-user (MU) Physical Layer Convergence Protocol (PLCP) protocol data unit (PPDU) which specifies the multiple spatial streams allocated to an STA and the multiple unequal MCSs in the common field of the "SIG-B" field in the preamble. Correspondingly, the STA ID is repeated the same number of times in the multiple "STA-ID" fields of the "SIG-B" user field. Alternatively, multiple association IDs (AIDs) of the same STA can be respectively specified in the multiple "STA-ID" fields. An additional indication can be inserted to the "SIG-A" field to indicate that multiple MCSs are assigned to the STA. In some embodiments, an indication may be inserted in each "user specific field" that is followed by a next "user specific field" assigned to the same STA. The PPDU is then transmitted to the STA in MIMO and by using the allocated multiple spatial streams. The information carried in each group of spatial streams is modulated and encoded by using a different MCS. Upon receiving the PPDU, the STA resolves all the information associated with its STA ID or AIDs according to the multiple unequal MCSs and then combines the decoded information.

For an uplink MIMO transmission, the AP transmits a trigger frame to initiate an STA to transmit a trigger based (TB) PPDU in MIMO to the AP, In the trigger frame, multiple spatial streams and multiple MCSs are specified in the user information field, and the same STA ID is repeated in the same number of times in the corresponding "STA-ID" field of the user information fields. Alternatively, multiple association IDs (AIDs) of the same STA can be specified in the "STA-ID" fields. Upon receiving the trigger frame, the STA identifies the multiple MCSs associated with its STA ID or AIDs and transmits a PPDU to the AP in MIMO by using the multiple spatial streams and the corresponding unequal MCSs.

According to embodiments of the present disclosure, the user fields designed for identifying multiple users are reused for identifying a single STA and thereby associate the STA with the assigned multiple MCSs. This advantageously enables multiple unequal MCS assignment to a single STA without requiring a new packet format or any complicated modifications in the current AP and STA products. Hence unequal MCS allocation to a single STA can be achieved in a backward compatible manner.

In addition, most VHT and HE AP and non-AP station products that support multiple spatial stream transmission already have multiple encoders and decoders built in, especially for the devices that support MU-MIMO. Enabling grouped-unequal MCSs for single user MIMO transmission advantageously makes efficient use of hardware resources of the existing products.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1A:
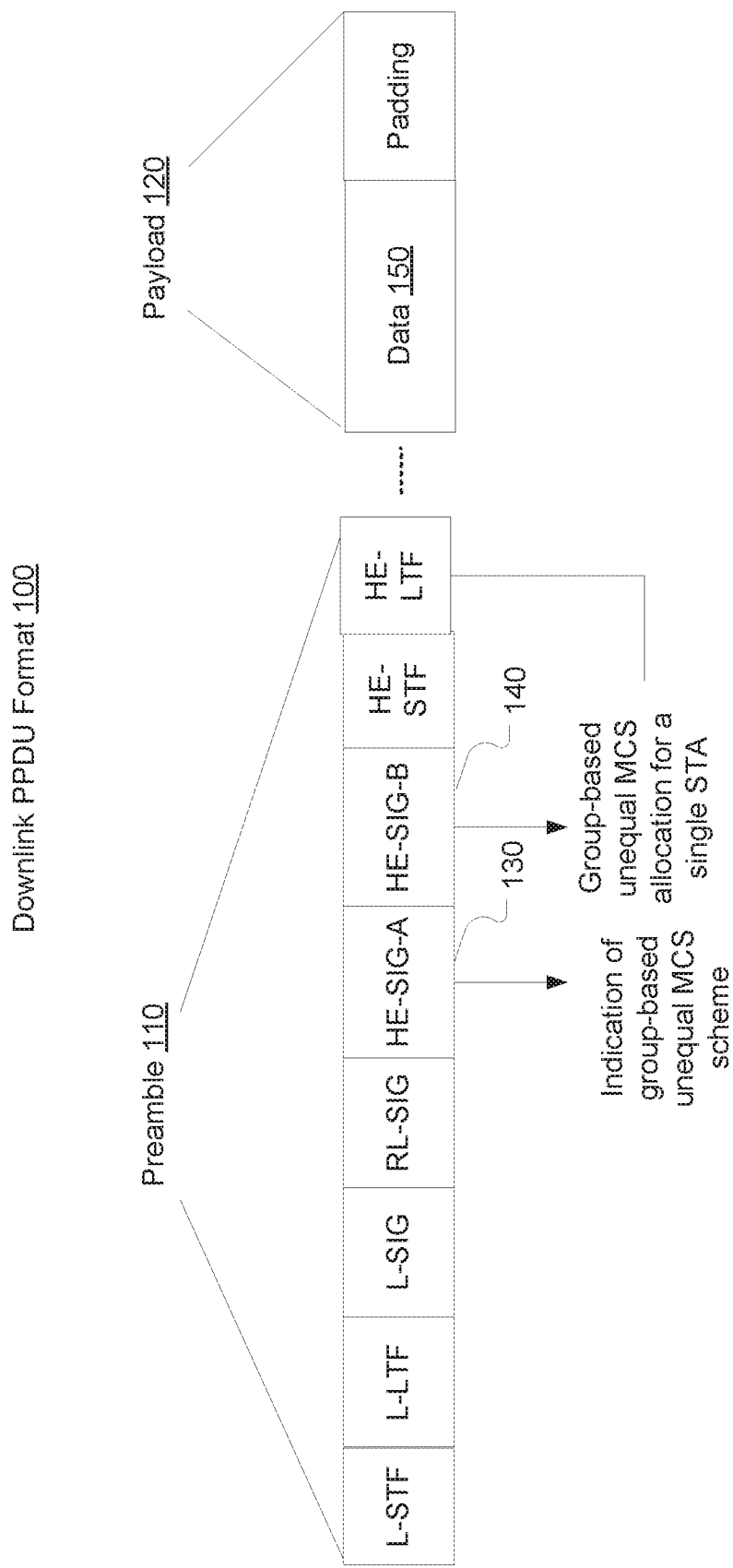
FIG. 1A illustrates the format of an exemplary downlink (DL) HE multi-user (MU) PPDU 100 including indications of unequal MCSs allocations to a single non-AP STA in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Embodiments of the present disclosure are described in detail with reference to the Physical Layer Convergence Protocol (PLCP) protocol data unit (PPDU) structure as defined in the high efficiency (HE) WLAN based IEEE 802.11 family of Specifications and Standards. However, the present disclosure is not limited to any specific packet formats or structures, nor limited to any specific industry standards or specifications.

Embodiments of the present disclosure provide communication protocols for transmitting a PPDU to, or from, a single user station (STA) in a multiple user, multiple output (MIMO) transmission by applying multiple unequal MCSs on different groups of spatial streams. Each group includes one or more spatial streams. Herein, the scheme of allocating multiple MCSs to a single user STA may be referred to as group-based unequal MCSs scheme. In some embodiments, an access point (AP) allocates multiple MCSs to an STA for an MIMO transmission and correspondingly specifies the STA ID repeatedly in the user specific field of a "SIG-B" field in a downlink PPDU, or in the user information field of a trigger frame for requesting an uplink MIMO transmission. Alternatively, multiple AIDs of the STA can be specified in the user specific field or the user information field instead of repeating the STA ID.

FIG. 1A illustrates the format of an exemplary downlink (DL) HE multi-user (MU) PPDU 100 including indications of unequal MCSs allocations to a single non-AP STA in accordance with an embodiment of the present disclosure. The PPDU 100 includes a preamble 110 and a payload 120. The PPDU 100 is generated by an AP and carries data 150 encoded and modulated in multiple RUs and directed to a single STA. The preamble 110 includes the short and long training fields ("L-STF," "L-LTF," "HE-STF," and "HE-LTF") and the signaling fields ("L-SIG," "RL-SIG," "HE-SIG-A," "HE-SIG-B").

The "HE-SIG-B" field 140 as defined in the current IEEE 802.11 Specifications and Standards can provide DL MU spatial stream and MCS allocation information to allow multiple receive STAs to look up the corresponding MCSs in the data field of the packet. According to embodiments of the present disclosure, group-based allocation of unequal MCSs for a single STA is specified in the "HE-SIG-B" field 140 as described in greater detail with reference to FIGS. 1B and 1C.

An additional indication may be included in the "HE-SIG-A" field 130 to indicate the group-based unequal MCS allocation scheme. For example, a reserved bit, e.g., B7, in "HE-SIG-A" is used. Based on this indication, the receive STA can determine whether to resolve only one user field or multiple fields in the "HE-SIG-B" as described in greater detail with reference to FIGS. 1B and 1C.

Figure 1B:
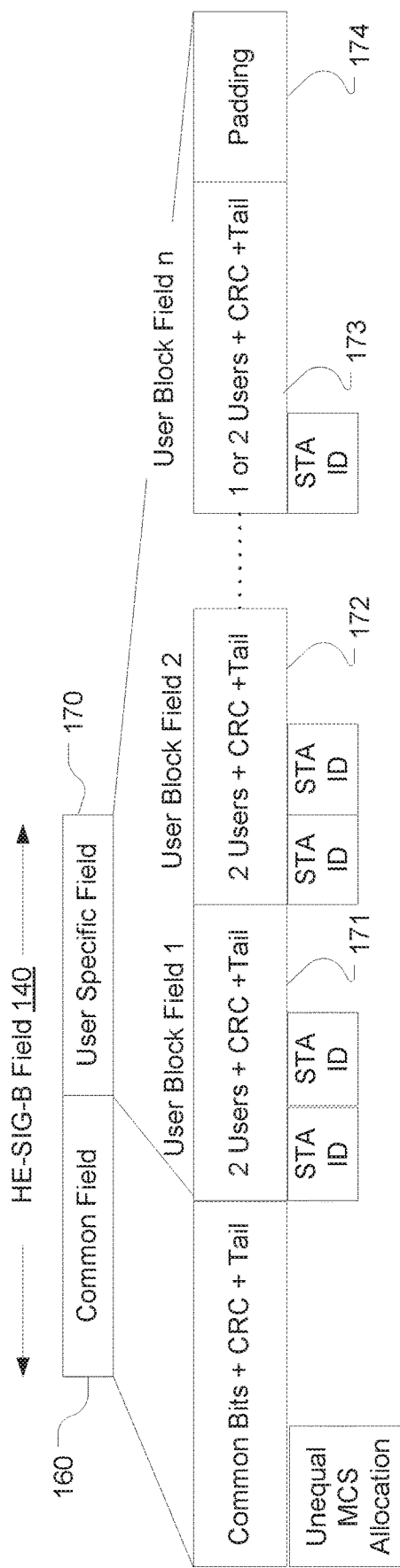
FIG. 1B illustrates format of the "HE-SIG-B" field 140 in the exemplary PPDU 100 in which an STA ID is repeated in the user specific fields in correspondence to the groups spatial streams and multiple MCSs assigned to one STA according to an embodiment of the present disclosure.

FIG. 1B illustrates format of the "HE-SIG-B" field 140 in the exemplary PPDU 100 in which an STA ID is repeated in the user specific fields in correspondence to the groups spatial streams and multiple MCSs assigned to one STA according to an embodiment of the present disclosure. For example, the "HE-SIG-B" field 140 is separately encoded on each 20 MHz. The "HE-SIG-B" field 140 includes a "Common Field" 160 and a "User Specific Field" 170 which collectively may be referred to as the HE-SIG-B content channel. The "Common Field" 160 carries the information regarding spatial stream allocation, resource unit (RU) allocation in frequency domain, RUs allocated to MU-MIMO and the number of users in MU-MIMO allocation.

The "User Specific Field" 170 includes zero or more "User Block Fields," e.g., field 171, 172 and 173 which may be followed by padding 174. Each "User Block Field" includes two user fields designed to contain information for up to two STAs to decode their payloads, a cyclic redundancy check (CRC) sequence and a trail. Each user field includes a "STA-ID" field, the value of which represents the identification of the one or two STAs. Each User Specific Field may further include fields for information related to the STAs, such as spatial stream configuration indicating the number of spatial streams for an STA for an MIMO transmission, modulation and coding scheme (e.g., "MCS"), coding mechanism "Coding").

For an MU PPDU with unequal MCSs assigned to multiple user STAs, the values in the "STA-ID" fields of the user fields represent the STA IDs, e.g., two STA IDs in one user block field. According to embodiments of the present disclosure, the ID of one STA (STA ID) is repeated multiple times in the one or more user fields in correspondence to the number of MCSs assigned to the STA. Once the STA receives the PPDU and locates the STA IDs in the user fields, it can resolve all the information encoded in the multiple MCSs. For any other STAs that receive the PPDU, including legacy STAs, this part of the information is ignored and would not cause unwanted operations. That is, information directed to one STA in an MIMO transmission can be encoded in multiple MCSs in a backward compatible manner.

Figure 1C:
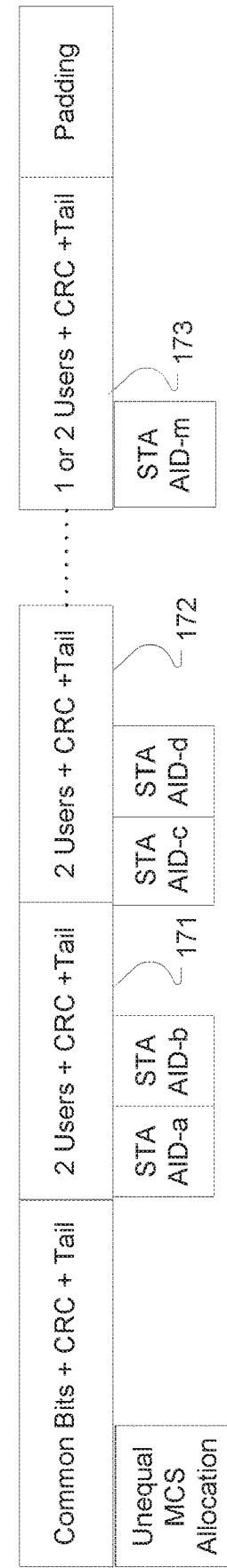
FIG. 1C illustrates the format of the "HE-SIG-B" field in the exemplary PPDU 100 in which different AIDs of an STA are assigned in the user fields in correspondence to the multiple MCSs assigned to the STA according to another embodiment of the present disclosure.

In some other embodiments, multiple STA IDs or associate station IDs (AIDs) are assigned to one STA, which can be specified in the one or more user fields in correspondence to the number of MCSs assigned to the STA. FIG. 1C illustrates the format of the "HE-SIG-B" field 140 in the exemplary PPDU 100 in which different AIDs of an STA are assigned in the user fields in correspondence to the multiple MCSs assigned to the STA according to another embodiment of the present disclosure. Once the STA receives the PPDU and locate the AIDs, the STA can resolve all the information associated with the STA which is carried in the multiple spatial streams and encoded using unequal MCSs. Similarly, for any other STAs that receive the PPDU, including legacy STAs, this part of the information is ignored and would not cause unwanted operations.

In some embodiments, the AIDs are assigned in the "HE-SIG-B" field 140 in a particular order such that, when the STA locates one AID in the PPDU, it knows whether to wait to resolve for another MCS allocation with its next AID. In some embodiments, a particular AID (e.g., AID #m) is reserved for the legacy equal MCS mode while another AID (e.g., AID #n) is reserved for the unequal MCSs mode. The media access control (MAC) header may indicate the difference between AID #m and AID #n. When the receive STA finds the AID #n in the HE-SIG-B field of the PPDU, it continue to resolve the HE-SIG-B field.

Figure 1D:
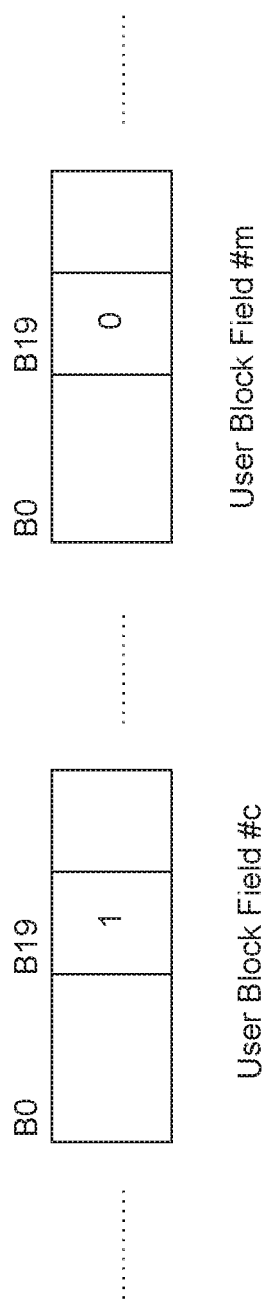
FIG. 1D illustrates the format of the "SIG-B" field in which a "user block field" encloses an indication regarding following "user block field" with respect to MCS assignment in accordance with an embodiment of the present disclosure.

In some embodiment, the multiple user block fields" assigned for a same STA may not be contiguous in the "HE-SIG-B" field. An indication can inserted in a "user block field" if the one or more following "user block fields" include information for the same STA, e.g., indicating that a following user field is set in correspondence to another MCS allocated to the STA. With this indication, the receive STA can determine whether to stop processing the "HE-SIG-B field" in search for information directed to the STA. FIG. 1D illustrates the format of the "SIG-B" field in which a "user block field" encloses an indication regarding following "user block field" with respect to MCS assignment in accordance with an embodiment of the present disclosure. In this example, the bit B19 in "user block field #c" is set to "1" to indicate that a following "User Block Field" in the "SIG-B" field is also related to the same STA. When the receive station locates its STA ID in the "User Block Field #c" and discovering that the B19 bit set to "1," the receive STA continues processing the SIG-B field until "user block field #m" in which the B19 bit is set "0" since it indicates that no more "User Block Field" contains an ID of this STA.

It will be appreciated that, the downlink PPDU may be an MU PPDU and directed to multiple user STAs and therefore also include MCS allocation or spatial stream allocation information related to one or more other STAs besides the STA allocated with multiple unequal MCSs as described in FIGS. 1A-1D. For example, each of the one or more other STAs may be assigned with a single MCS or multiple MCSs.

Figure 2A:
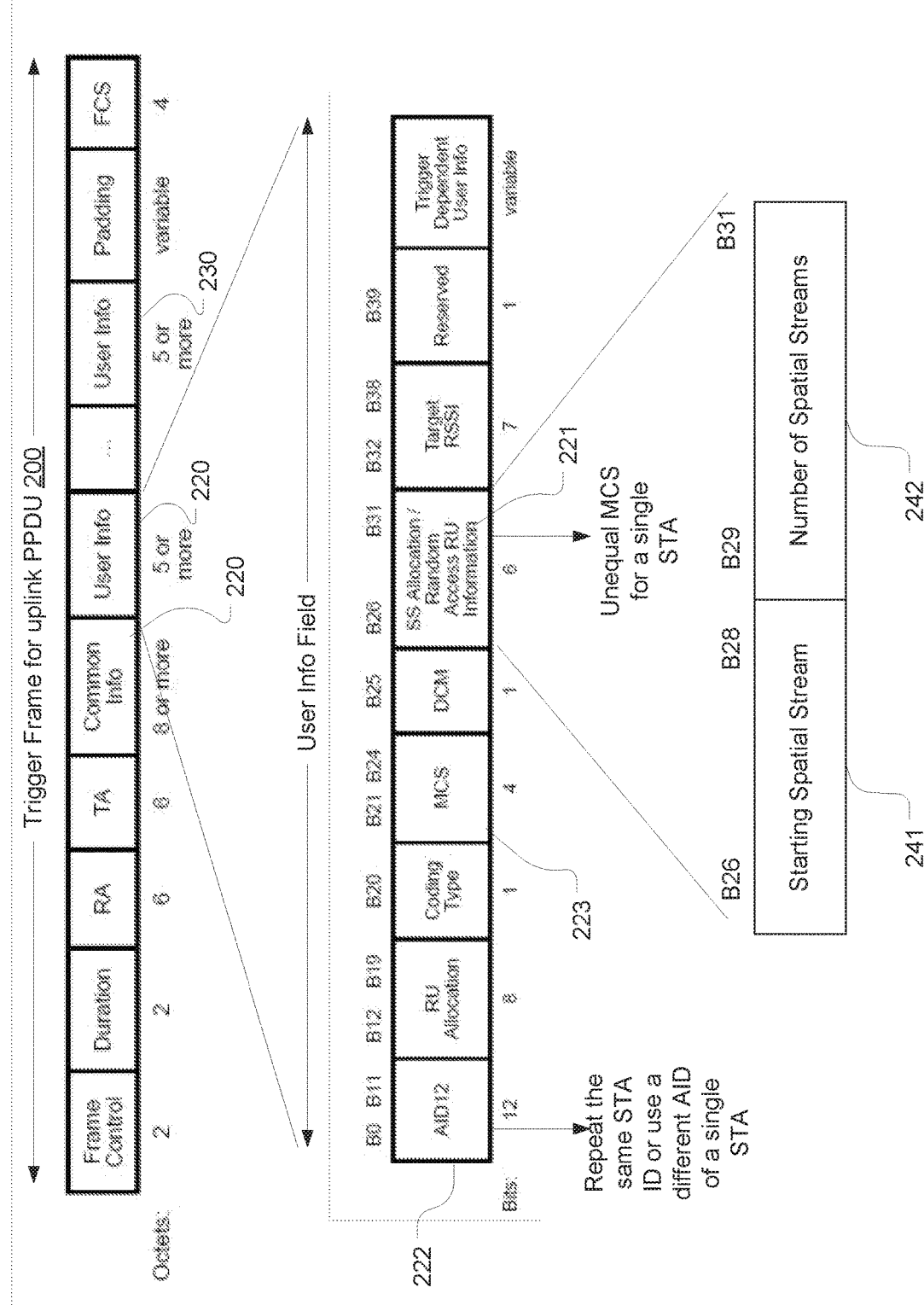
FIG. 2A illustrates the format of an exemplary uplink (UL) trigger frame used to trigger an MIMO transmission from an STA by using multiple unequal MCSs in accordance with an embodiment of the present disclosure.

To initiate an uplink MIMO transmission in a WLAN, an AP may first send a trigger frame to an STA enclosing the spatial stream allocation and MCS assignment information. According to the MCS assignment signaling in the trigger frame, the STA transmits a trigger-based PPDU to the AP in an MIMO transmission and by using allocated multiple spatial streams that are encoded in different MCSs. The trigger frame may itself be included in a PPDU transmitted from the AP. FIG. 2 illustrates the format of an exemplary uplink (UL) trigger frame 200 used to trigger an MIMO transmission from an STA by using multiple unequal MCSs in accordance with an embodiment of the present disclosure.

The trigger frame 200 includes a frame control field (e.g., "Frame Control"), a transmission duration field ("Duration"), receiver address and transport address fields ("RA" and "TA"), a common information field ("Common Info") and one or more user information field ("User info"), a padding ("Padding") and a frequency check sequence ("FCS"). The common field 210 has a subfield used to indicate the type of trigger frame. For a conventional MU transmission, each user information field 220 contains the IDs of the multiple STAs to be triggered (e.g., "AID12"), allocated RUs ("RU Allocation"), allocated spatial streams ("SS Allocation Random Access RU Information") as well as other information required for the uplink MU transmission, such as coding type, modulation and coding scheme ("MCS"), dual carrier modulation ("DCM"), target received signal strength indicator ("Target RSSI"), and trigger dependent user information.

According to embodiments of the present disclosure. The ID or IDs of a single STA can be specified in the user information fields in correspondence to the multiple MCSs allocated to it. As shown, the "AID 12" in multiple user information fields repeats the same STA ID. Alternatively, the "AID12" field 222 uses a different AID of the STA in each user information field. The "MCS" field 223 contains one of the MCSs assigned to the STA. The "SS allocation" field 221 specifies a group of spatial streams for encoding by using the specified MCS as in field 223. The "SS allocation" field 221 contains a field 241 for indicating a staring spatial stream and a field 242 for indicating a number of spatial streams allocated to the group.

The repeated STA ID or the list of AIDs in combination with the unequal MCSs assignment information serve to signal the receive STA to generate a subsequent uplink PPDU and transmit the PPDU to the AP in MIMO according to the allocated spatial streams and MCSs.

In some embodiments, the AIDs are assigned in the user information fields in a particular order such that, when the STA locates one AID in the trigger frame, it knows whether to wait to resolve for another MCS allocation with its next AID. In some embodiments, a particular AID (e.g., AID #m) reserved for the legacy equal MCS mode while another AID (e.g., AID #n) is reserved for the unequal MCSs mode. The media access control (MAC) header may indicate the difference between AID #m and AID #n. When the receive STA finds the AID #n in a user information field of the trigger frame, it continue to resolve the HE-SIG-B field.

Figure 2B:
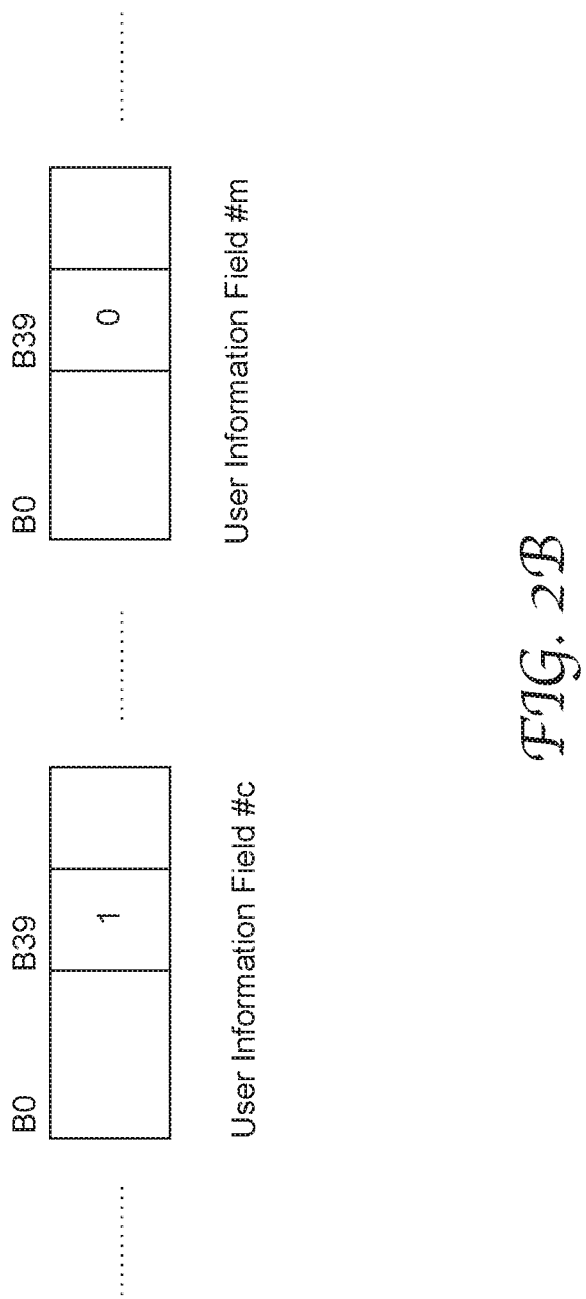
FIG. 2B illustrates the format of user information fields in which a "user information field" encloses an indication regarding following "user information field" with respect to MCS assignment in accordance with an embodiment of the present disclosure.

FIG. 2B illustrates the format of user information fields in which a "user information field" encloses an indication regarding following user information fields with respect to MCS assignment in accordance with an embodiment of the present disclosure. In this example, the bit B39 in "User Information Field #c" is set to "1" to indicate that a following "User Information Field" is also related to the same STA. When the receive station locates its STA ID in the "User Information Field #c" and discovering that the B39 bit set to "1," the receive STA continues processing the trigger frame until "User Information Field #m" in which the B39 bit is set "0" since it indicates that no more "User Information Field" contains an ID of this STA.

It will be appreciated that, the trigger frame (e.g., in the form of an HE PPDU) may be directed to multiple user STAs and therefore also include spatial stream allocation and MCS assignment information related to one or more other STAs besides the STA assigned with multiple MCSs described above. For example, each of the one or more other STAs may use one or more MCSs.

Figure 3A:
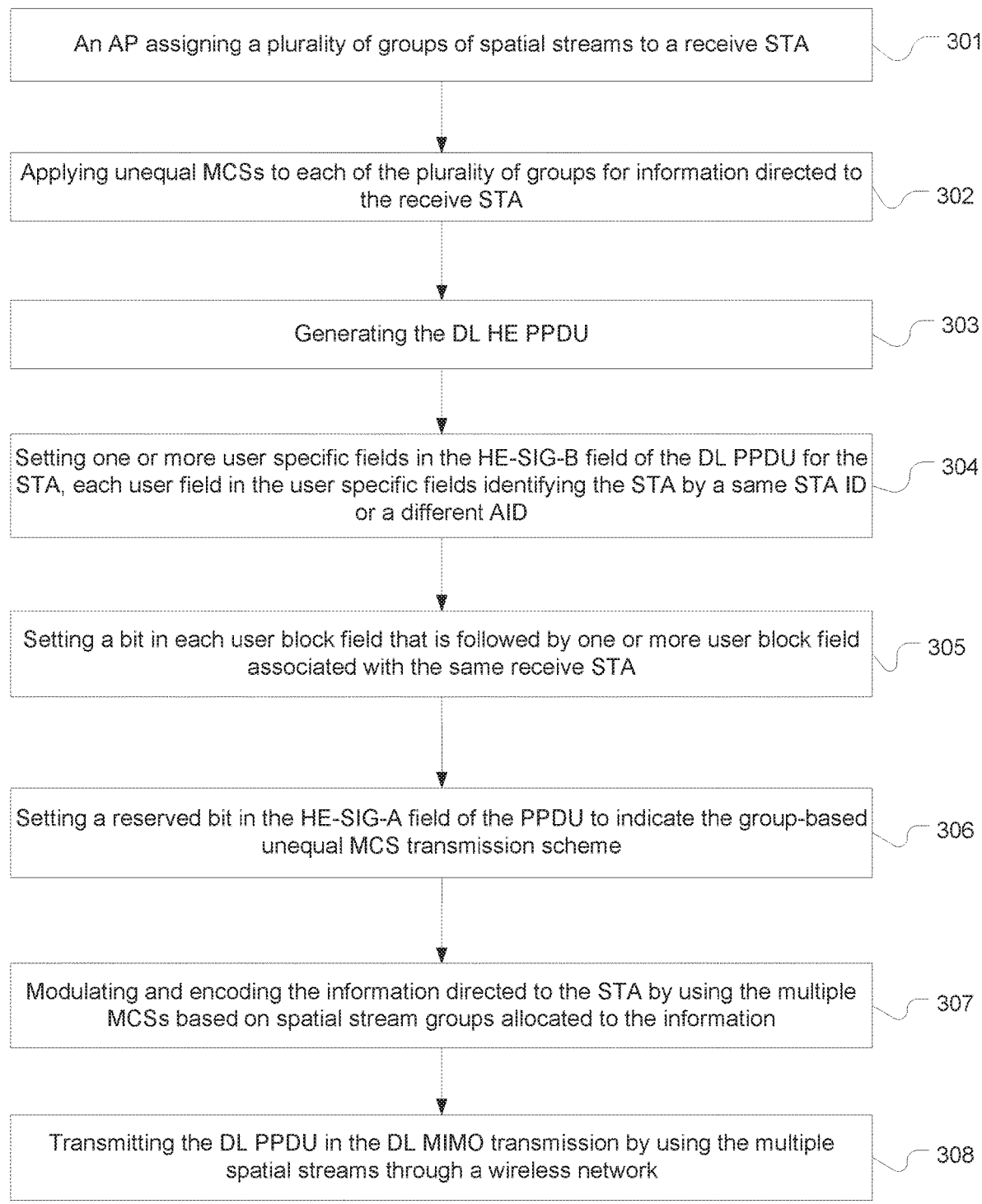
FIG. 3A is a flow chart depicting an exemplary process of assigning unequal MCSs to a plurality of spatial streams for an STA and transmitting a DL PPDU to the STA in MIMO in accordance with an embodiment of the present disclosure.

FIG. 3A is a flow chart depicting an exemplary process 300 of assigning unequal MCSs to a plurality of spatial streams for an STA and transmitting a DL PPDU to the STA in MIMO in accordance with an embodiment of the present disclosure. At 301, an AP assigns a plurality of spatial streams to a receive STA for transmitting an HE PPDU to the STA in a downlink MIMO transmission. The spatial streams are assigned into groups. At 302, the AP assigns unequal MCSs to the plurality of groups for information directed to the STA. At 303, the AP generates the DL HE PPDU. At 303, in the PPDU preamble, one or more user specific fields in the HE-SIG-B field are set for the STA. Each user block field in a user specific field identifies the STA once or twice by using the STA ID or AIDs. In some embodiments, in correspondence to the number of MCSs allocated to the STA, an STA ID may be repeated the same number of times in the user specific field, as shown in FIG. 1B. In some other embodiments, different AIDs of the STA are assigned in the user specific field, each corresponding to a group of spatial stream and an MCS allocated to the STA.

At 305, a bit in each user block field is set to indicate whether the present user block field is followed by one or more user block field associated with the same STA. At 306, a particular bit in the HE-SIG-A field of the PPDU preamble is set to indicate that one STA is assigned with multiple MCSs, or the group-based unequal MCS assignment scheme. At 307, the information directed to the STA is modulated and encoded by using the multiple unequal MCSs based on the spatial stream grouping.

At 308, the PPDU is transmitted to the STA in a DL MIMO transmission through a wireless network by using the allocated multiple spatial streams.

Figure 3B:
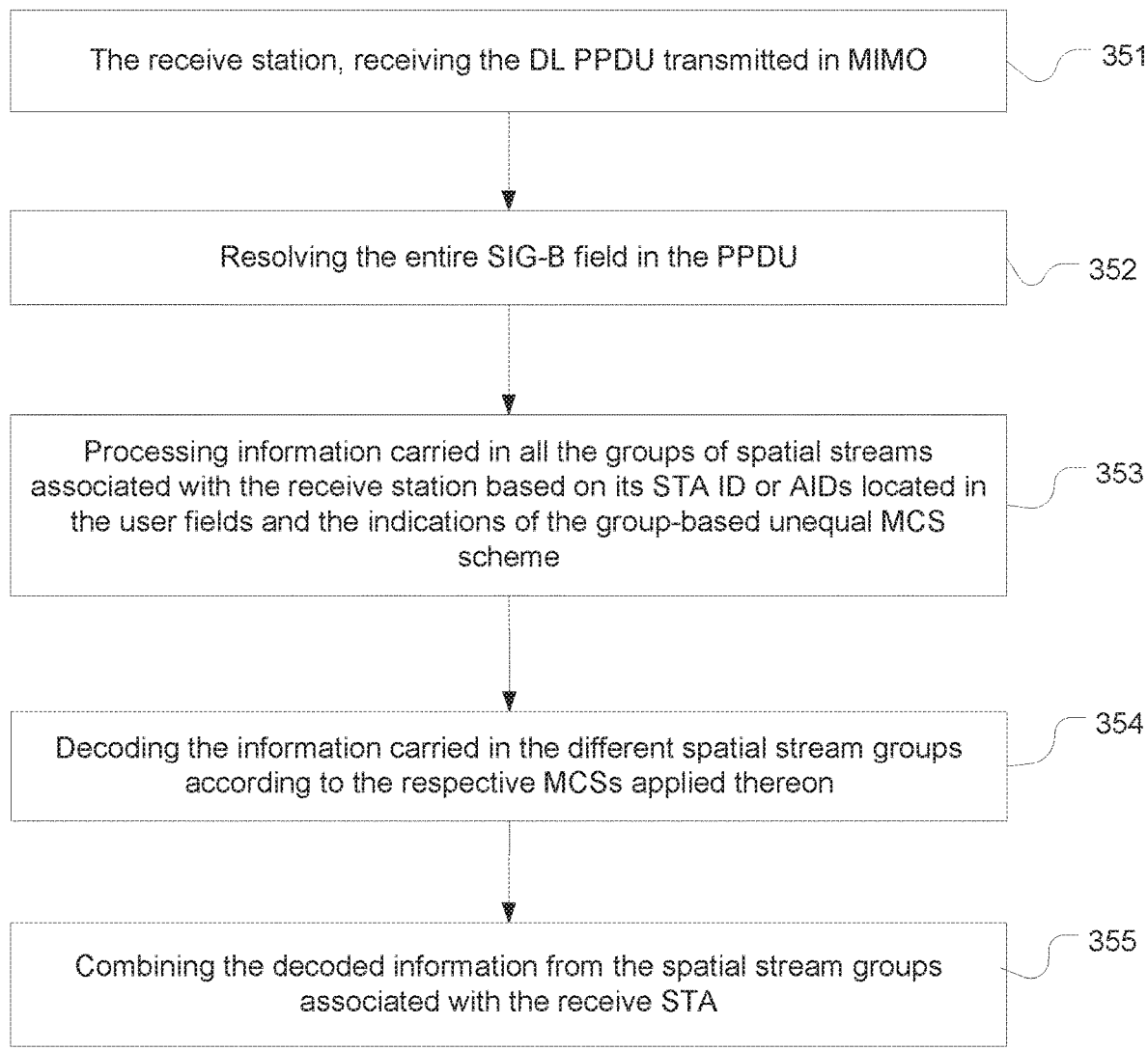
FIG. 3B is flow chart depicting an exemplary process of an STA resolving a received DL PPDU that is transmitted in MIMO by using a group-based unequal MCSs scheme in accordance with an embodiment of the present disclosure.

FIG. 3B is flow chart depicting an exemplary process 350 of an STA resolving a received DL PPDU that is transmitted in MIMO by using a group-based unequal MCSs scheme in accordance with an embodiment of the present disclosure. The DL PPDU may be generated transmitted by using process 300 as shown in FIG. 3A. At 351, the receive STA receives the DL PPDU transmitted in an MIMO transmission. At 352, the STA resolves the SIG-B field in the PPDU preamble. At 353, the STA processes the information carried in all the groups of the spatial streams associated with the STA based on its STA ID or AIDs located in the user fields of the SIG-B field, and further based on the indication of the group-based unequal MCSs scheme in the SIG-A field. At 354, the information carried in the different groups of spatial streams is decoded according to the respective MCSs applied on the groups. At 355, the decoded information of different spatial groups associated with the STA is combined for further processing.

Figure 4A:
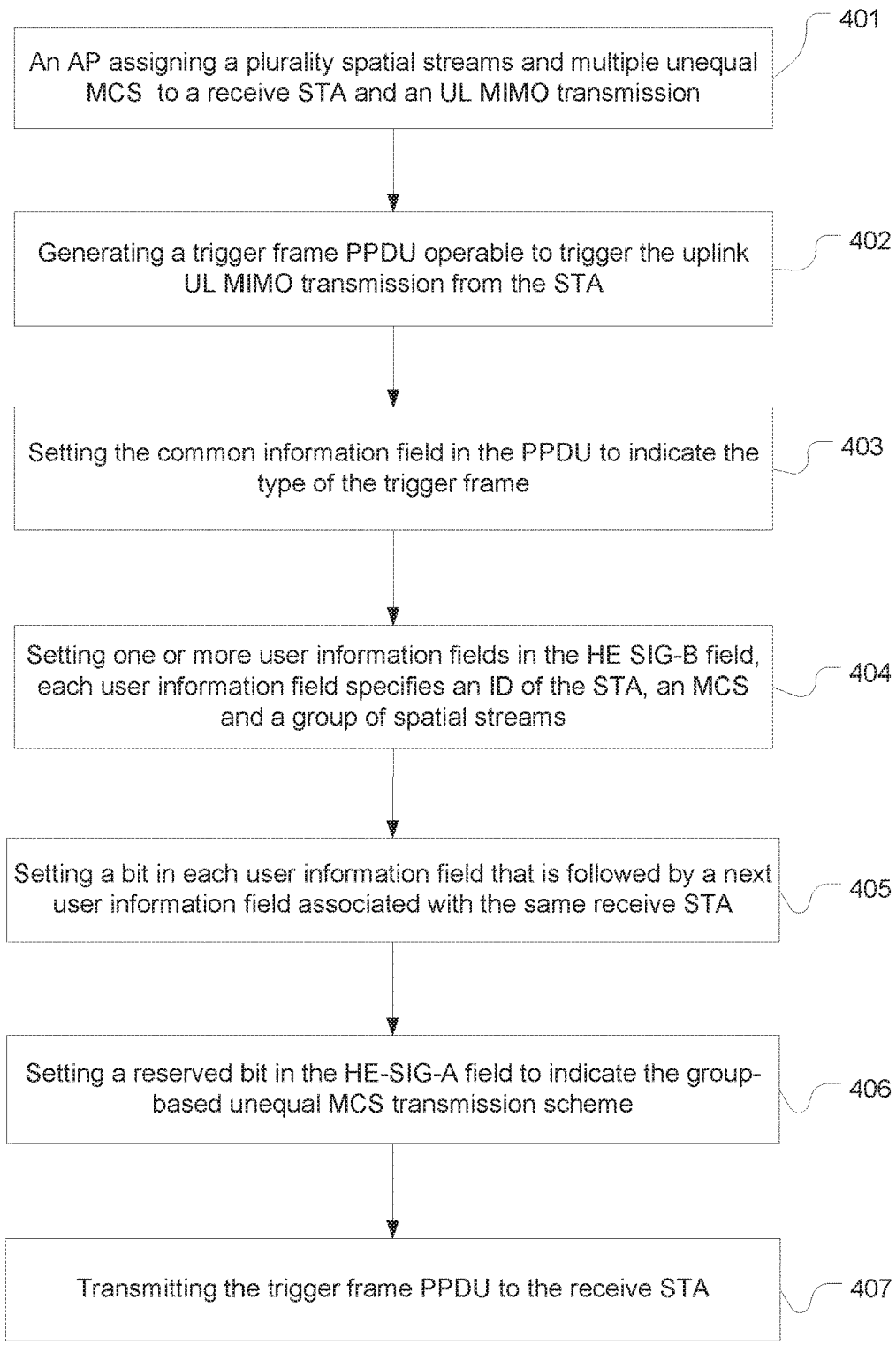
FIG. 4A is a flow chart depicting an exemplary process of transmitting a trigger frame from an AP to an STA in order to trigger a UL MIMO transmission that uses a group-based unequal MCSs scheme from the STA in accordance with an embodiment of the present disclosure.

FIG. 4A is a flow chart depicting an exemplary process 400 of transmitting a trigger frame from an AP to an STA in order to trigger a UL MIMO transmission that uses a group-based unequal MCSs scheme from the STA in accordance with an embodiment of the present disclosure. At 401, the AP allocates a plurality of spatial streams to an STA for a UL MIMO transmission and assigns multiple MCSs to the STA for the transmission. At 402, an HE PPDU is generated which includes a trigger frame operable to trigger the STA to transmit a trigger-based (TB) PPDU to the AP in the UL MIMO transmission. At 403, the common field in the trigger frame is set to indicate the type of the trigger fame. At 404, one or more user information fields in the trigger frame HE-SIG-B field are set, where each field specifies an ID of the STA, an MCS and a group of spatial streams as described in greater detail with reference to FIG. 2. Different MCSs are specified for multiple groups of spatial streams allocated to the STA. In some embodiments, in correspondence to the number of MCSs allocated to the STA, the STA ID may be repeated the same number of times in the user information fields, as shown in FIG. 2. In some other embodiments, different AIDs of the STA are set in the user information fields, each AID corresponding to an MCS or a spatial stream group allocated to the STA.

At 405, for each user information field that is be followed by one or more user information fields assigned to the same STA, an indication (e.g., one particular bit) is set to signal the receive STA to continue resolving the HE-SIG-B field. At 406, a reserved bit in the HE-SIG-A field is set to indicate that the group-based unequal MCSs transmission scheme is specified in this trigger frame. At 407, the trigger frame PPDU is transmitted to the STA via a wireless network.

Figure 4B:
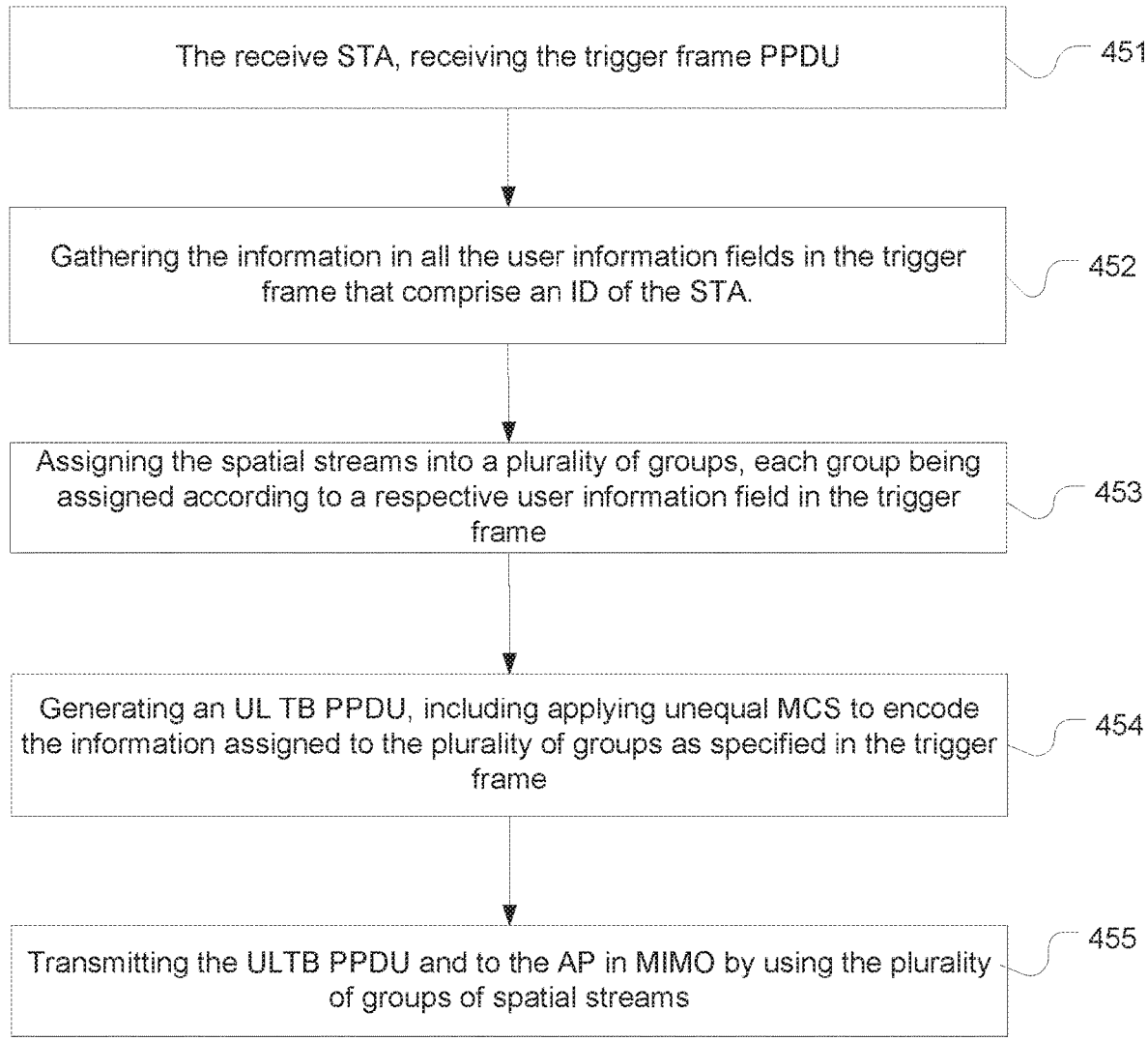
FIG. 4B is a flow chart depicting an exemplary process of an STA transmitting a UL PPDU in MIMO by using a group-based unequal MCSs scheme in response to a trigger frame in accordance with an embodiment of the present disclosure.

FIG. 4B is a flow chart depicting an exemplary process 450 of an STA transmitting a UL PPDU in MIMO by using a group-based unequal MCSs scheme in response to a trigger frame in accordance with an embodiment of the present disclosure. At 451, the STA receives a trigger frame PPDU from the AP, for example that is generated according to process 400 in FIG. 4A. The trigger frame includes indications of group-based unequal MCSs assigned to the STA as described in greater detail with reference to FIGS. 2 and 4A. At 452, the STA gathers the information in all the user information fields in the trigger frame that have an ID of the STA, either its STA ID or its AIDs. At 453, the STA assigns the spatial streams into a plurality of groups as specified in the spatial stream allocation fields of the trigger frame. Each group is associated with an MCS according to a respective user information field. Accordingly, at 454, an UL TB PPDU is generated and the information assigned to the plurality of groups is encoded in different MCSs. At 455, the UL TB PPDU is transmitted to the AP in an MIMO transmission by using the plurality of spatial streams.

Figure 4C:
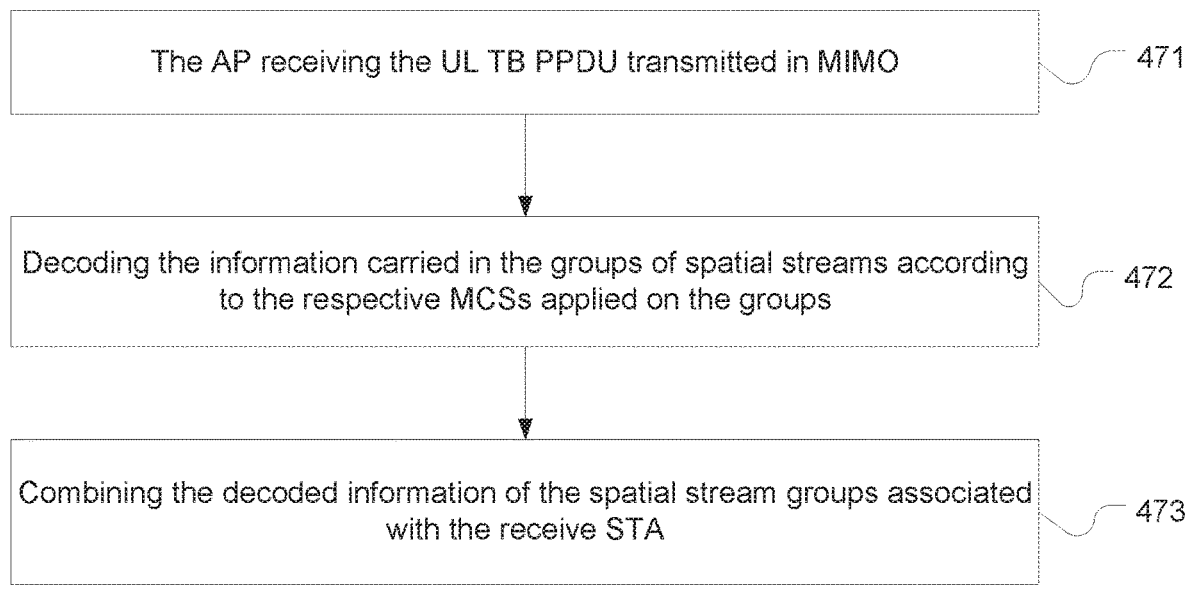
FIG. 4C is a flow chart depicting an exemplary process of an AP resolving an UL PPDU transmitted from an STA in MIMO by using a group-based unequal MCSs scheme in accordance with an embodiment of the present disclosure.

FIG. 4C is a flow chart depicting an exemplary process 470 of an AP resolving an UL PPDU transmitted from an STA in MIMO by using a group-based unequal MCSs scheme in accordance with an embodiment of the present disclosure. At 471, the AP receives the UL TB PPDU transmitted in an MIMO transmission. For example, the UL TB PPDU is generated and transmitted as shown in FIG. 4B. At 472, the AP decodes the information carried in the groups of spatial streams according to the respective MCSs applied on them. At 473, the decoded information of different spatial streams groups associated with the STA is combined.

Figure 5:
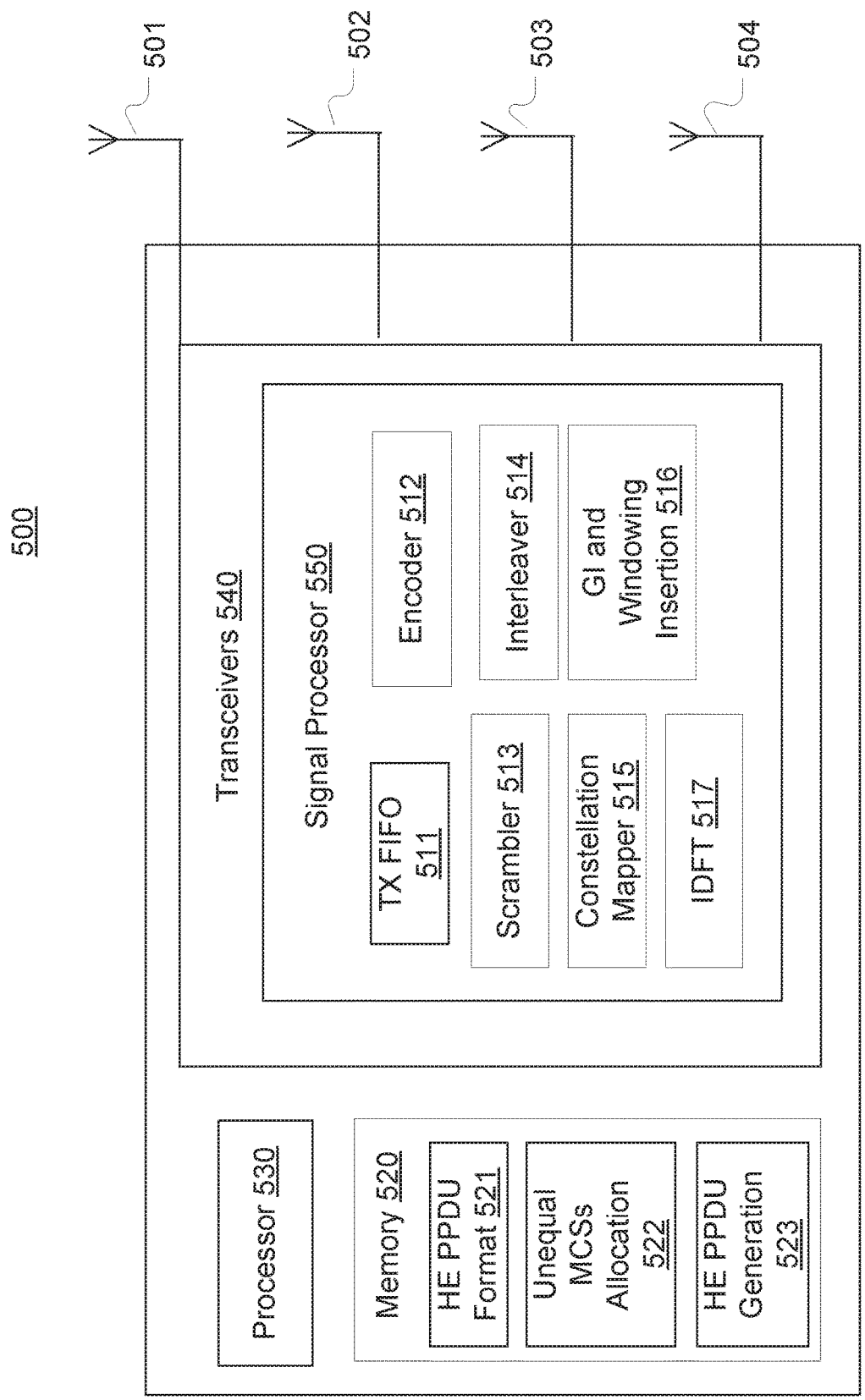
FIG. 5 is a block diagram illustrating an exemplary wireless communication device capable of generating and transmitting a PPDU with specifications of unequal MCSs assigned to one STA in an MIMO transmission in accordance with an embodiment of the present disclosure.

FIG. 5 is a block diagram illustrating an exemplary wireless communication device 500 capable of generating and transmitting a PPDU with specifications of unequal MCSs assigned to one STA in an MIMO transmission in accordance with an embodiment of the present disclosure. The communication device 500 may be an AP or an STA device having a transceiver configured for data communication, e.g., a general purpose computer, a smart phone, a portable electronic device, a tablet wearable device, a sensor used on Internet of Things (IoT), and etc.

The device 500 includes a main processor 530, a memory 520 and a transceiver 540 coupled to an array of antenna 501-504. The memory 520 stores the HE PPDU formats including the format of signaling the spatial stream allocation and unequal MCS assignments to a single STA for an MIMO transmission as described in detail with reference to FIGS. 1A-2B. The memory also stores processor-executable instructions that implement an unequal MCSs allocation module 522 and HE PPDU generation module 523. The unequal MCSs allocation module 522 may use any suitable allocation algorithms, methods or policies to allocate multiple MCSs to respective groups of spatial streams for an STA without departing from the scope of the present disclosure. The HE PPDU generation module 523 can generate signaling and indications related to the MCSs and spatial stream allocation in the HE-SIG-B and HE-SIG-A fields as described with reference to FIGS. 1A-4B, as well as other sections of the PPDU.

The transceiver 540 includes a signal processor 550 having various modules of the transmit path which is configured to generate each section of a PPDU or any other type of communication transmission unit. For instance, the signal processor 550 includes a transmit First-In-First-Out (TX FIFO) 511, an encoder 512, a scrambler 513, an interleaver 5N, a constellation mapper 515, an inversed discrete Fourier transformer (IDFT) 517, and a guard interval (GI) and windowing insertion module 516.

Figure 6:
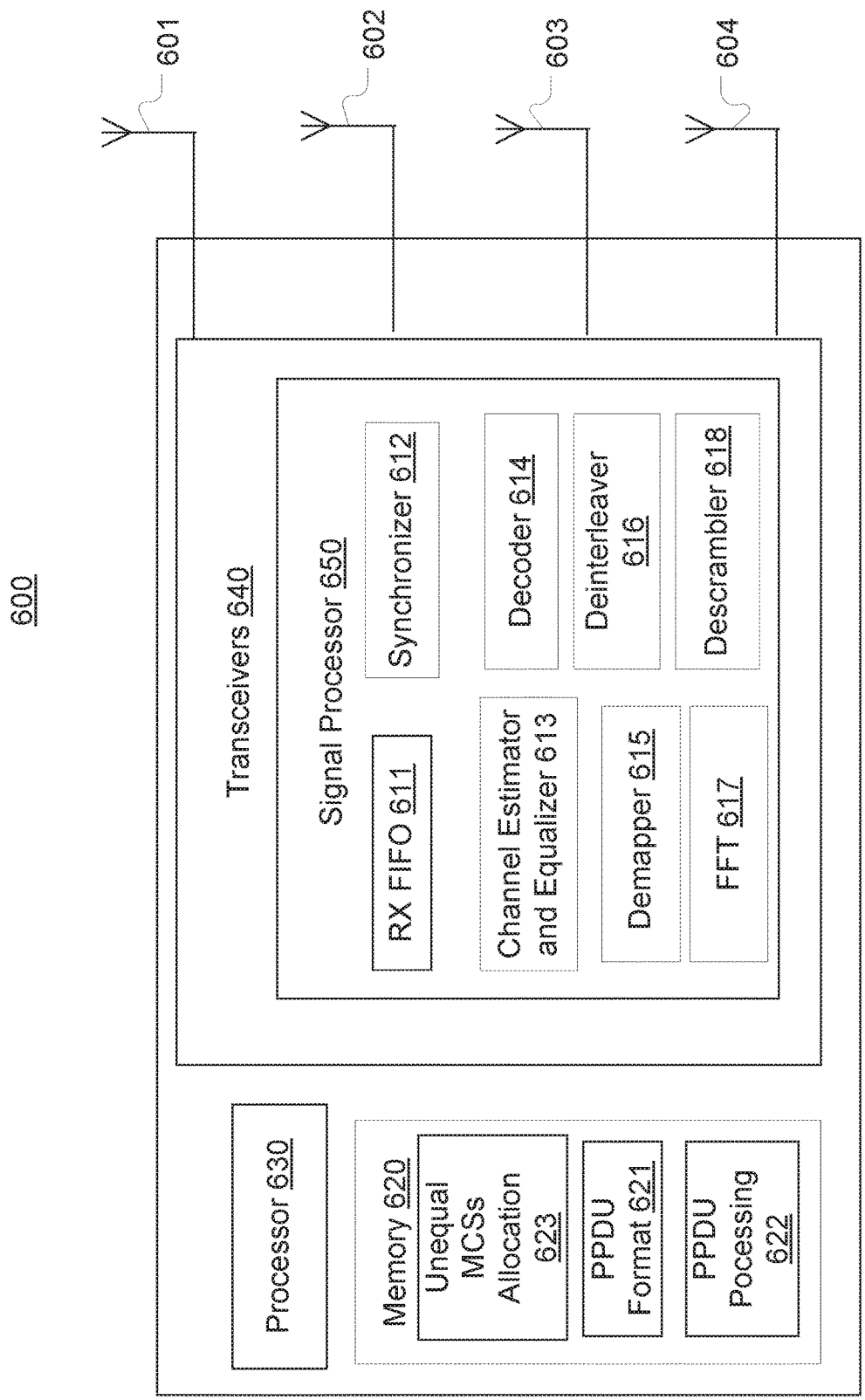
FIG. 6 is a block diagram illustrating the configuration of an exemplary wireless communication device operable to resolve a received PPDU with specifications of unequal MCSs assigned to one STA in an MIMO transmission according to an embodiment of the present disclosure.

FIG. 6 is a block diagram illustrating the configuration of an exemplary wireless communication device 600 operable to resolve a received PPDU with specifications of unequal MCSs assigned to one STA in an MIMO transmission according to an embodiment of the present disclosure. The device 600 may be an AP or a non-AP station configured for data communication, e.g., a general purpose computer, a smart phone, a portable electronic device, a tablet wearable device, a sensor used on Internet of Things (IoT), and etc.

The device 600 including a main processor 630, a memory 620 and a transceiver 640 coupled to an array of antenna 601-604. The transceiver 640 includes a signal processor 610 having various modules of the receive path which is configured to process a PPDU or any other type of communication transmission units. For instance, the signal processor 610 includes a receive First-In-First-Out (RX FIFO) 5611, a synchronizer 612, a channel estimator and equalizer 613, a decoder 614, a demapper 615, a deinterleaver 616, a fast Fourier transformer (FFT) 617, and a descrambler 618.

The memory 620 stores PPDU formats 621 including the format of signaling the spatial stream allocation and unequal MCS assignments to a single STA for an MIMO transmission as described in detail with reference to FIGS. 1A~2. The PPM processing module 622 stores processor-executable instructions for resolving various sections of the PPDU, including the preamble according to the PPDU format. Once the signal processor 650 detects that the user block fields in a DL PPDU or the user information fields in a trigger frame that include the ID of the STA, and based on the instructions from the PPDU processing module 622, the signal processor 650 processes the preamble accordingly, as described in detail with reference to FIGS. 1A~4B.

It will be appreciated that each of the signal processors in FIG. 5 and FIG. 6 may include a wide range of other suitable components that are well known in the art. The various components can be implemented in any suitable manner that is well known in the art and can be implemented using hardware logic, software logic or a combination thereof. Further, in some embodiments, the transceiver 540 in FIG. 4 may as well include the components in a receive path as described in greater detail with reference to the transceiver 640 in FIG. 5, and vice versa.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, said method comprising:
    at a signal transmitting station, allocating multiple spatial streams to a signal receiving station for a multiple input, multiple output (MIMO) transmission;
    assigning the multiple spatial streams into a plurality of groups, each group comprising one or more spatial streams of the signal receiving station;
    assigning multiple unequal modulation and coding schemes (MCSs) to said multiple spatial streams of the signal receiving station, wherein each group of the plurality of groups is associated with a respective MCS;
    setting a preamble of a Physical Layer Convergence Protocol (PLCP) protocol data unit (PPDU) to specify the multiple spatial streams of the signal receiving station;
    setting multiple user fields in said preamble of said PPDU using a same station ID of the signal receiving station, wherein each of said multiple user fields comprises a station identification (ID) of said signal receiving station in correspondence to a MCS allocated to a respective group of spatial streams of the signal receiving station; and
    transmitting said PPDU to said signal receiving station corresponding to the same station ID set in the multiple user fields,
    wherein said PPDU comprises a trigger frame operable to trigger said signal receiving station to transmit a trigger-based (TB) PPDU in said MIMO transmission to said transmit station using said multiple spatial streams and said multiple unequal MCSs.

2. The method of claim 1, further comprising setting an SIG-A field in said preamble to indicate that said PPDU specifies multiple unequal MCSs allocated to said signal receiving station for said MIMO transmission.

3. The method of claim 1, wherein said setting multiple user fields comprises setting said multiple user fields with a plurality of association IDs of said signal receiving station.

4. The method of claim 3, wherein said plurality of association IDs (AIDs) are set in said multiple user fields in a particular order or comprises a particular AID of said signal receiving station, wherein said particular order or said particular AID indicates that multiple unequal MCSs are allocated to said signal receiving station for said MIMO transmission.

5. The method of claim 1, wherein said setting said multiple user fields further comprises inserting an indication in a user field of said multiple user fields to indicate that a following user field is set in correspondence to another MCS allocated to said signal receiving station.

6. The method of claim 1, wherein said signal transmitting station is an access point (AP) station and said signal receiving station is a non-AP station, wherein said MIMO transmission is a downlink data transmission of said PPDU by using said multiple spatial streams and said multiple unequal MCS, wherein said multiple user fields are contained in one or more user block fields of a SIG-B field in said preamble.

7. The method of claim 1, wherein said transmit station is an access point (AP) station and said signal receiving station is a non-AP station, and wherein said MIMO transmission is an uplink data transmission.

8. The method of claim 7, wherein said multiple user fields are contained in multiple user information fields in said trigger frame.

9. The method of claim 7, further comprising:
    said AP station receiving said TB PPDU from said non-AP station;
    decoding information transmitted in each of said plurality of groups of spatial streams according to a corresponding MCS; and
    combining decoded information associated with said plurality of groups of spatial streams with respect to said signal receiving station.

10. A method of wireless communication, said method comprising:
    at a non-access point (non-AP) station, receiving a downlink (DL) Physical Layer Convergence Protocol (PLCP) protocol data unit (PPDU) transmitted in a DL multiple input multiple output (MIMO) transmission, wherein said DL PPDU comprises:
        a common field in a preamble of said PPDU, wherein said common field comprises specification of multiple spatial streams allocated to a signal receiving station used for transmitting said DL PPDU, wherein said multiple spatial streams are assigned into a plurality of groups and multiple unequal MCSs are used for said plurality of groups in said DL MIMO transmission, wherein each group corresponds to a respective MCS; and
        multiple user fields in said preamble comprising a same station identification (ID) of said signal receiving station in correspondence to an MCS allocated to a group of said plurality of groups of spatial streams allocated to said signal receiving station;
    resolving an SIG-B field in said preamble in entirety;
    decoding information transmitted in said plurality of groups of spatial streams allocated to said signal receiving station corresponding to said same station ID in said DL PPDU according to said multiple unequal MCS; and
    combining decoded information from said plurality of spatial groups allocated to said signal receiving station corresponding to said same station ID,
    wherein said PPDU comprises a trigger frame operable to trigger transmission of a trigger-based (TB) PPDU in said DL MIMO transmission using said multiple spatial streams and said multiple unequal MCSs.

11. The method of claim 10, wherein said multiple user fields are contained in one or more user block fields of an SIG-B field in said preamble.

12. The method of claim 11, wherein an SIG-A field in said preamble indicates that said DL PPDU specifies multiple unequal MCSs allocated to the signal receiving station for said DL MIMO transmission.

13. The method of claim 10, wherein multiple user fields comprises a plurality of association IDs (AIDs) of said signal receiving station.

14. The method of claim 13, wherein said plurality of AIDs are located in said multiple user fields in a particular order or comprises a particular AID of said signal receiving station, wherein said particular order or said particular AID indicates that multiple unequal MCSs are allocated to said signal receiving station for said DL MIMO transmission.

15. The method of claim 10, wherein a respective user field of said multiple user fields comprises an indication that a following user field is set in correspondence to another MCS allocated to said signal receiving station.

16. The method of claim 10 further comprising:
receiving a trigger frame from an AP station, wherein said trigger frame specifies multiple spatial streams allocated to said non-AP station for an uplink (UL) MIMO transmission, wherein said trigger frame comprises a plurality of user information field associated with said non-AP station and each user information field comprises:
an ID of said non-AP station;
a group of spatial streams, where each group comprises one or more spatial streams;
an MCS assigned to said group;
resolving said plurality of user information fields responsive to locating said one or more IDs of said non-AP station;
grouping said multiple spatial streams into a plurality of groups according to plurality of user information fields; and
generating a trigger-based (TB) PPDU for transmission in said UL MIMO transmission.

17. A wireless communication device comprising:
a memory;
a processor coupled to the memory, wherein said memory comprises instructions that, when executed by said processor, cause said wireless communication device to:
   allocate multiple spatial streams to a signal receiving station for a multiple input, multiple output (MIMO) transmission;
   assign the multiple spatial streams allocated to the signal receiving station into a plurality of groups, each group comprising one or more spatial streams; and
   assign multiple unequal modulation and coding schemes (MCSs) to said multiple spatial streams, wherein each group is associated with a respective MCS; and
a transceiver coupled to said memory, wherein said transceiver is configured to:
   generate an Physical Layer Convergence Protocol (PLCP) protocol data unit (PPDU), wherein generating said PPDU comprises;
      setting a preamble of a Physical Layer Convergence Protocol (PLCP) protocol data unit (PPDU) to specify the multiple spatial streams; and
      setting multiple user fields in said preamble of said PPDU using a same station ID of the signal receiving station, wherein each of said multiple user fields corresponds to an MCS allocated to a respective group of spatial streams; and
   transmit said PPDU to said signal receiving station corresponding to the same station ID set in the multiple user fields,
   wherein said PPDU comprises a trigger frame operable to trigger said signal receiving station to transmit a trigger-based (TB) PPDU in said MIMO transmission to said AP station using said multiple spatial streams and said multiple unequal MCSs.

18. The wireless communication device of claim 17, wherein said generating said PPDU further comprising setting an SIG-A field in said preamble to indicate that said PPDU specifies multiple unequal MCSs allocated to said signal receiving station for said MIMO transmission.

19. The wireless communication device of claim 17, wherein said setting said multiple user fields comprises setting said multiple user fields with a plurality of association IDs (AIDs) of said signal receiving station.

20. The wireless communication device of claim 17, wherein said plurality of AIDs are set in said multiple user fields in a particular order or comprises a particular AID of said signal receiving station, wherein said particular order or said particular AID indicates that multiple unequal MCSs are allocated to said signal receiving station for said MIMO transmission.

21. The wireless communication device of claim 17, wherein said setting said multiple user fields further comprises inserting an indication in a respective user field of said multiple user fields to indicate that a following user field is set in correspondence to another MCS allocated to said signal receiving station.

22. The wireless communication device of claim 17, wherein said wireless communication device is an access point (AP) station and said signal receiving station is a non-AP station, wherein said MIMO transmission is a downlink data transmission of said PPDU by using said multiple spatial streams and said multiple unequal MCS, wherein said multiple user fields are contained in one or more user block fields of a SIG-B field in said preamble.

23. The wireless communication device of claim 17, wherein said wireless communication device is an AP station and said signal receiving station is a non-AP station, and wherein said MIMO transmission is an uplink data transmission.

24. The wireless communication device of claim 23, wherein said multiple user fields are contained in multiple user information fields in said trigger frame.

25. The wireless communication device of claim 23, wherein said transceiver is further configured to:
receive said TB PPDU from said non-AP station;
decode information transmitted in each of said plurality of groups of spatial streams according to a corresponding MCS; and
combine decoded information associated with said plurality of groups of spatial streams with respect to said signal receiving station.

* * * * *